UNITED STATES PATENT OFFICE 2,215,457

AROMATIC MERCURY SULPHONATES AND PROCESS OF MAKING THEM

Carl N. Andersen, Wellesley Hills, Mass., assignor to Lever Brothers Company, a corporation of Maine No Drawing. Application April 19, 1935,
Serial No. 17,271

22 Claims. (Cl. 260—433)

The present invention relates to the method of producing certain new organic mercury compounds, particularly organic mercury sulphonates, and to the compounds produced thereby.

It is an object of my invention to produce new organic mercury sulphonates useful as germicides and for other therapeutic purposes.

I have discovered that when the hydrogen atom in a compound containing the sulphonic group, $-SO_2.OH$, is replaced by the essential radical of certain aromatic mercury compounds, compounds are produced which have extraordinarily high potency as antiseptics and germicides, and at the same time are characterized by relatively low toxicity and other desirable properties.

The compounds I have produced may be described as having the general formula $(RHg)_x.R_1$, in which R represents an aromatic structure, to a carbon atom of which the mercury is directly attached; in which $x$ represents the number of RHg groups in the compound; and in which $R_1$ is a radical corresponding to an aliphatic or aromatic compound having one or more sulphonic groups. The compounds will all therefore contain one or more of the characteristic groups, $-SO_2.O.HgR$. While the word "group" is used hereinafter, it is obvious that it is to be understood as plural where the value of $x$ is more than one.

More particularly, R represents an aromatic structure, which may be an aromatic nucleus with or without side chains, and the expression "aromatic structure" used herein, is intended to be generic and include an aromatic nucleus with or without side chains. The aromatic structure is of the type in which none of the nuclear or side chain carbon atoms has direct linkage with any elements other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms other than the one attached to mercury, and any side chain carbon atoms, have their valences satisfied either by carbon or hydrogen. Examples are the diphenyl, tolyl, xylyl, and naphthyl groups.

The radical $R_1$ may represent any aliphatic or aromatic radical corresponding to a compound containing one or more sulphonic groups.

Examples of these compounds are the aliphatic sulphonic acids, such as ethylsulphonic acid, $C_2H_5SO_3H$; the substituted aliphatic sulphonic acids, such as isethionic acid, $$OHCH_2.CH_2SO_3H;$$

and the unsaturated sulphonic acids such as ethylene sulphonic acid, $CH_2:CHSO_3H$.

Other examples include aromatic sulphonic acids such as benzene sulphonic acid, $C_6H_5SO_3H$; naphthalene sulphonic acid, $C_{10}H_7SO_3H$; substituted benzene sulphonic acids, such as sulphanilic acid, $NH_2.C_6H_4SO_3H$; 2-nitro bromobenzene 4-sulphonic acid, $Br.NO_2.C_6H_3.SO_3H$; ortho-nitro benzene sulphonic acid $NO_2.C_6H_4SO_3H$; salicylic sulphonic acid, $HOOC.OH.C_6H_3.SO_3H$, and benzoic sulphonic acid, $HOOC.C_6H_4.SO_3H$; pilynuclear sulphonic acids, such as 1-naphthylamine, 4-sulphonic acid $NH_2.C_{10}H_6.SO_3H$.

Compounds containing two sulphonic groups such as naphthalene 1,5-disulphonic acid, $$C_{10}H_6(SO_3.H)_2,$$

are additional examples.

My invention also includes aromatic mercury compounds containing ore or more acid radicals other than the sulphonic group having their replaceable acid hydrogens replaced by aromatic mercury radicals, for example, benzoic sulphonic acid, $RHgOOC.C_6H_4.SO_3HgR$.

Many dyes contain sulphonic groups, for example, Benzo Fast Orange (Schultz, 7th ed., #305, "Colour Index" #326). Aromatic derivatives of dyes of this type are included within the scope of my invention.

Another type of compound included are the aromatic mercury derivatives of products resulting from the reaction of fatty compounds and sulphuric acid. When a fatty compound, especially a higher fatty alcohol, is treated with sulphuric acid, one or both of two principal types of sulphonated compounds may be formed: $XSO_2OH$ and $XOSO_2OH$, where X is the radical corresponding to a saturated or unsaturated fatty compound. In compounds of the first mentioned type the sulphur is attached directly to a carbon atom. In compounds of the last mentioned type the sulphur is linked to the carbon atom through oxygen. This latter type is also known as a sulphated compound, but inasmuch as it contains the $-SO_2OH$ group it may be described as sulphonated as this term is used herein. Examples of saturated alcohols which are so treated are cetyl, lauryl and octadecyl. When an unsaturated alcohol such as oleyl alcohol is so treated the sulphonation may take place through the alcoholic radical or it may take place through the double bond alone or in addition to the alcoholic radical. Fatty acids may be similarly treated.

I have prepared aromatic mercury derivatives from a sufficiently representative number of the above compounds to lead me to believe that all of the sulphonic compounds of the type described heretofore may be employed to produce my novel mercury compounds. The compounds so prepared have in greater or lesser, but always in relative high degree, desirable antiseptic and germicidal properties. I therefore regard my invention as generic to and including the entire group of sulphonic compounds.

One method by which my novel compounds may be prepared consists in reacting together a compound containing a sulphonic acid group and a compound containing an aromatic mercury radical of the above mentioned type. A common solvent for both reacting components is employed. The aromatic mercury compound formed is usually relatively insoluble as compared with the reacting components and upon its precipitation may be filtered, washed and dried. If the compound formed is relatively soluble, the solution may be concentrated after which the compound will crystallize out. The compound I prefer to use is the aromatic mercury hydroxide. This has the advantage that water is the only other product formed and the resulting compound is therefore easily purified. In some instances other soluble aromatic mercury compounds such as the lactate or the acetate may be employed.

The following specific examples are given as illustrative of advantageous ways of practicing the process of my invention, as well as to illustrate representative organic mercury sulphonates falling within the scope of my invention.

Example I 17.64 grams of phenylmercury hydroxide is dissolved in 4 liters of water and heated until solution is complete. The solution is filtered to remove any insoluble material. To the filtrate is added an aqueous solution containing 14.71 grams of 1-naphthylamine 4-sulphonic acid. A precipitate is formed and the mixture is allowed to stand after which the precipitate is filtered, washed well with warm water and dried. Upon heating, it slowly decomposes above 200° C. The compound is phenylmercury 1-naphthylamine 4-sulphonate.

Example II 17.64 grams of phenylmercury hydroxide is dissolved in 4 liters of water and heated until solution is complete. The solution is filtered to remove any insoluble material. To the filtrate is added an aqueous solution containing 11.42 grams of sulphanilic acid. The mixture is allowed to stand and a precipitate forms which, after filtering, is washed and dried. It does not melt up to 250° C., but begins to decompose slowly at 245° C. The compound is phenylmercury sulphanilate.

Example III 17.64 grams of phenylmercury hydroxide is suspended in 50 cc. of water. The mixture is stirred for a few minutes to wet the material as completely as possible and then 7.2 grams of ethyl sulphonic acid, 100% straight (9.7 grams of 75% material) is added. This is stirred rapidly and heat develops indicating that the reaction is proceeding. In order to speed the reaction the mixture is refluxed for about 20 minutes, 200 cc. of water is added and boiled for a few minutes to get as large a percentage of the material in solution as possible. It is filtered while hot and upon cooling a crystalline precipitate separates. This is separated by filtration, washed and dried. Upon recrystallization of the material from alcohol the crystals appear wet at 182° C. It puffs up at 186° and forms a white crust which does not melt at 210° C. The compound is phenylmercury ethyl sulphonate.

Example IV 17.64 grams of phenylmercury hydroxide is suspended in 100 cc. of water and to this suspension is added 50 cc. of water containing 9.48 grams of benzene sulphonic acid. The mixture is heated to boiling for about 10 minutes and then 200 cc. of water is added and heating continued for a few minutes. The solution is filtered while hot. On cooling, crystals form in the solution, which may be separated by filtration, washed well with water and dried. They have a melting point of 167° C. The compound is phenylmercury benzene sulphonate.

Example V 35.28 grams of phenylmercury hydroxide is dissolved in two liters of water and heated until solution is complete. The solution is filtered while hot to remove any insoluble material. To the filtrate is added 17.28 grams of naphthalene 1,5-disulphonic acid dissolved in 100 cc. of water. A precipitate results at once and the mixture is heated for a few minutes and filtered while hot. Upon cooling additional crystals separate from the mother liquor. To obtain a further yield the mother liquor may be concentrated and allowed to cool. The material is washed with water and recrystallized from alcohol. It does not melt at 250° C. and is the compound naphthalene 1,5-diphenylmercury sulphonate.

Example VI 17.64 grams of phenylmercury hydroxide is dissolved in two liters of water and heated until solution is complete. The solution is filtered to remove any insoluble material. To the hot solution is added 5.52 grams of ortho-sulphobenzoic anhydride. Upon concentrating the solution to a small volume a white crystalline precipitate is formed. This is separated by filtration, washed and recrystallized from alcohol. It melts at 195° C. with effervescence and is the diphenylmercury salt of ortho-sulphobenzoic acid.

Example VII 11.18 grams of lauryl alcohol is treated with 5.88 grams of concentrated sulphuric acid. The mixture is heated until the reaction is complete, after which it is diluted with water and added directly to one liter of alcohol in which 17.64 grams of phenylmercury hydroxide is dissolved. A white turbidity resulted on the addition but on boiling the greater portion of the material dissolves. Boiling is continued until the solution is reduced to one-half its original volume. Upon cooling a white flocculent precipitate separates. The material is filtered, washed with alcohol and dried. It fuses at 176° C. and remains unchanged up to 260° C. It is phenylmercury lauryl sulphate or sulphonate or a mixture of the two.

All the other compounds of this group may be similarly treated with an aromatic mercury compound to form the corresponding aromatic mercury salt. From the specific examples given, it will be obvious to one skilled in the art what procedure is to be followed in producing these other compounds. Theoretical quantities are generally employed with approximately 10% excess of the sulphonic compound, in order to insure complete conversion of the aromatic mercury compound.

The operativeness of the process is not found to depend in any degree upon the temperature at which the reaction is effected. It is convenient to use heat because it facilitates the solubility of the reacting components and speeds the reaction, but the process can be carried out at a lower temperature, for example, room temperature.

Any suitable solvent in which the reacting components are soluble may be used as the medium for carrying out the reaction. If they are both soluble in water this is generally used for reasons of convenience. But if not, other solvents such as the alcohols or acetone, or mixtures of these with each other or with water, may be employed.

All of the compounds produced as above described are characterized by extraordinarily high potency as germicides. Tests to determine the efficacy of some of them in killing *B. Typhosus* and *Staph. aureus* were carried on under the following conditions:

Aqueous solutions of varying dilutions from 1:10,000 upward until killing ceased, were made up.

These dilutions were employed in the conduct of the tests according to the following methods:

Circular 198, U. S. Dept. of Agriculture, Dec. 1931, described as F. D. A. method against *Eberthella typhi* (typhoid bacillus) at 37° C. and F. D. A. Special Method against *Staph. aureus* at 37° C.

As illustrative of the potency of the compounds, the killing power of the following compounds is given merely as illustrative.

The figures represent the maximum dilutions at which killing in 15 minutes resulted.

| | B. typhosus | Staph. aureus |
|---|---|---|
| Phenylmercury 1-naphthylamine 4-sulphonate | 1:70,000 | 1:40,000 |
| Phenylmercury benzene sulphonate | 1:70,000 | 1:30,000 |
| Phenylmercury ethylsulphonate | 1:50,000 | 1:30,000 |
| Phenylmercury derivative of Benzo Fast Orange | 1:40,000 | 1:50,000 |

In addition to their high germicidal value, all of these compounds are characterized by relatively low toxicity. Because of these properties it is possible to use them in extreme dilutions and in many situations where known germicides, because of toxic or other undesired properties cannot be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. The method of preparing aromatic mercury sulphonates wherein an aromatic mercury group is linked to a sulphonic radical by replacement of the hydrogen atom thereof, which comprises reacting in solution an organic sulphonic compound selected from the group of organic sulphonic compounds consisting of aliphatic and aromatic compounds containing the sulphonic acid group, with an aromatic mercury hydroxide of the class wherein mercury is directly connected to a carbon atom of an aromatic structure in which none of the carbon atoms has direct linkage with any element other than hydrogen, carbon and mercury.

2. The method of preparing aromatic mercury sulphonates wherein an aromatic mercury group is linked to a sulphonic radical by replacement of the hydrogen atom thereof, which comprises reacting in solution an aliphatic compound containing the sulphonic acid group with an aromatic mercury hydroxide of the class wherein mercury is directly connected to a carbon atom of an aromatic structure in which none of the carbon atoms has direct linkage with any element other than hydrogen, carbon and mercury.

3. The method of preparing aromatic mercury sulphonates wherein an aromatic mercury group is linked to a sulphonic radical by replacement of the hydrogen atom thereof, which comprises reacting in solution an aromatic compound containing the sulphonic acid group with an aromatic mercury hydroxide of the class wherein mercury is directly connected to a carbon atom of an aromatic structure in which none of the carbon atoms has direct linkage with any element other than hydrogen, carbon and mercury.

4. A method of preparing phenylmercury sulphonates wherein the phenylmercury group is linked to a sulphonate radical, which comprises reacting in solution an organic sulphonic compound selected from the group of organic sulphonic compounds consisting of aliphatic and aromatic compounds containing the sulphonic acid group, with phenylmercury hydroxide.

5. A method of preparing phenylmercury sulphonates wherein the phenylmercury group is linked to a sulphonate radical, which comprises reacting in solution an aliphatic compound containing the sulphonic acid group with phenylmercury hydroxide.

6. A method of preparing phenylmercury sulphonates wherein the phenylmercury group is linked to a sulphonate radical, which comprises reacting in solution an aromatic compound containing the sulphonic acid group with phenylmercury hydroxide.

7. A new aromatic mercury compound of the general formula $(RHg)_xR_1$, in which R represents an aromatic structure to a carbon atom of which the mercury is directly attached and in which none of the carbon atoms has direct linkage with any element other than hydrogen, carbon and mercury; in which $R_1$ represents a radical containing the sulphonic group that is linked to the RHg group; and in which $x$ is an integer representing the number of RHg groups in the compound, which integer is at least one and not more than the number of sulphonic groups in the radical $R_1$.

8. A new aromatic mercury compound of the general formula $(RHg)_xR_1$, in which R represents an aromatic structure to a carbon atom of which the mercury is directly attached and in which none of the carbon atoms has direct linkage with any element other than hydrogen, carbon and mercury; in which $R_1$ represents an aliphatic radical containing the suphonic group that is linked to the RHg group; and in which $x$ is an integer representing the number of RHg groups in the compound, which integer is at least one and not more than the number of sulphonic groups in the radical $R_1$.

9. A new aromatic mercury compound of the general formula $(RHg)_xR_1$, in which R represents an aromatic structure to a carbon atom of which the mercury is directly attached and in which none of the carbon atoms has direct linkage with any element other than hydrogen, carbon and mercury; in which $R_1$ represents an aromatic radical containing the sulphonic group that is linked to the RHg group; and in which $x$ is an integer representing the number of RHg groups in the compound, which integer is at least one and not more than the number of sulphonic groups in the radical $R_1$.

10. A new aromatic mercury compound of the general formula $(RHg)_xR_1$, in which R represents an aromatic structure to a carbon atom of which the mercury is directly attached and in which none of the carbon atoms has direct linkage with any element other than hydrogen, carbon and mercury; in which $R_1$ represents a substituted aromatic radical containing the sulphonic group that is linked to the RHg group; and in which $x$ is an integer representing the number of RHg groups in the compound, which integer is at least one and not more than the number of sulphonic groups in the radical $R_1$.

11. A new organic compound of the general formula $C_6H_5Hg)_xR_1$, in which $R_1$ represents a radical containing the sulphonic group; and in which $x$ is an integer representing the number of $C_6H_5Hg$ groups in the compound, which integer is at least one and not more than the number of sulphonic groups in the radical $R_1$.

12. A new organic compound of the general formula $(C_6H_5Hg)_xR_1$, in which $R_1$ represents a radical of an aliphatic compound containing the sulphonic group; and in which $x$ is an integer representing the number of $C_6H_5Hg$ groups in the compound, which integer is at least one and not more than the number of sulphonic groups in the radical $R_1$.

13. A new organic compound of the general formula $(C_6H_5Hg)_xR_1$, in which $R_1$ represents a radical of an aromatic compound containing the sulphonic group; and in which $x$ is an integer representing the number of $C_6H_5Hg$ groups in the compound, which integer is at least one and not more than the number of sulphonic groups in the radical $R_1$.

14. A new organic compound of the general formula $(C_6H_5Hg)_xR_1$, in which $R_1$ represents a radical of a substituted aromatic compound containing the sulphonic group; and in which $x$ is an integer representing the number of $C_6H_5Hg$ groups in the compound, which integer is at least one and not more than the number of sulphonic groups in the radical $R_1$.

15. A new organic mercury compound of the general formula $(C_6H_5Hg).R_1$, in which $R_1$ represents a radical of an aromatic compound containing a sulphonic group.

16. Phenylmercury ethyl sulphonate.

17. Phenylmercury 1-napthylamine 4-sulphonate.

18. Phenylmercury oleyl sulphonate.

19. A new organic mercury compound of the general formula $(C_6H_5Hg).R_1$, in which $R_1$ represents a radical of an aliphatic compound containing a sulphonic group.

20. A new organic compound of the general formula $C_6H_5Hg.SO_3R_1NH_2$, in which $R_1$ is an aromatic nucleus.

21. A process for producing a germicidal compound which consists in reacting an organic mercury germicide having the formula $C_6H_5Hg-X$ in which X is a radical selected from the group consisting of the OH and acid radicals with a sulphonic compound.

22. A new organic compound of the general formula $(C_6H_5Hg).R_1$, in which $R_1$ represents a radical of an organic sulphonic compound selected from the group of organic sulfonic compounds consisting of aliphatic and aromatic compounds.

CARL N. ANDERSEN.

CERTIFICATE OF CORRECTION.

Patent No. 2,215,457.  September 24, 1940.

CARL N. ANDERSEN.

It is hereby certified that error appears in the printed specification of the above numbered patent requiring correction as follows: Page 1, second column, line 11, for "pilynuclear" read --polynuclear--; line 19, for "ore" read --one--; page 4, first column, line 30, claim 11, before the formula "$C_6H_5Hg)_x \cdot R_1$" insert a parenthesis; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.